United States Patent [19]

Itoh et al.

[11] Patent Number: 4,628,773
[45] Date of Patent: Dec. 16, 1986

[54] METHOD AND APPARATUS FOR CONTROLLING HYDRAULICALLY-OPERATED CONTINUOUSLY VARIABLE TRANSMISSION OF BELT-AND-PULLEY TYPE

[75] Inventors: Hiroshi Itoh, Toyota; Shigeki Hiramatsu, Okazaki; Mitsuru Takada; Tadashi Tamura, both of Toyota, all of Japan

[73] Assignee: Toyota Jidosha Kabushiki Kaisha, Toyota, Japan

[21] Appl. No.: 665,367

[22] Filed: Oct. 26, 1984

[30] Foreign Application Priority Data

Oct. 28, 1983 [JP] Japan .................................. 58-203130

[51] Int. Cl.4 .............................................. B60K 41/16
[52] U.S. Cl. ........................................ 74/867; 474/28; 74/868
[58] Field of Search ...................... 474/28, 18; 74/867, 74/868, 866, 865

[56] References Cited

U.S. PATENT DOCUMENTS

| 4,387,608 | 6/1983 | Mohl et al. ............................ 474/18 |
| 4,476,746 | 10/1984 | Miki et al. ............................. 74/867 |
| 4,565,110 | 1/1986 | Ito .......................................... 74/868 |

FOREIGN PATENT DOCUMENTS

| 0076552 | 4/1983 | United Kingdom ................... 474/28 |
| 0092227 | 10/1983 | United Kingdom ................... 74/866 |
| 0100159 | 2/1984 | United Kingdom ................... 474/18 |
| 0120687 | 10/1984 | United Kingdom ................... 74/866 |

Primary Examiner—Lawrence J. Staab
Assistant Examiner—Martin G. Belisario
Attorney, Agent, or Firm—Oblon, Fisher, Spivak, McClelland & Maier

[57] ABSTRACT

System and method for controlling a continuously variable transmission having a pair of variable-diameter pulleys disposed on input and output shafts, and a corresponding pair of hydraulic cylinders to change effective diameters of the pulleys. A speed ratio control valve assembly is used to control flows of a fluid to and from one of the cylinders. The control valve assembly is selectively placed in one of three states consisting of a first state for feeding the fluid to the one cylinder, a second state for discharging the fluid from the one cylinder, and a third state for restricting the flow to or from the one cylinder. The first and third states are alternately established while a ratio of an operating time in the first state to that in the third state is changed, for controlling a rate of flow of the fluid into the one cylinder, and the second and third states are alternately established while a ratio of operating time in the second state to that in the third state is changed, for controlling a rate of flow of the fluid from the one cylinder, whereby the speed ratio of the transmission is continuously varied by the one cylinder under control of the speed-ratio control valve assembly.

16 Claims, 16 Drawing Figures

FIG. 8a

S1 : READING THROTTLE OPENING ANGLE $\theta$
AND ACTUAL ENGINE SPEED $N_A$

S2 : DETERMINING TARGET ENGINE SPEED $N_D$

S3 : CALCULATING ERROR $E = N_D - N_A$

S5 : TURNING OFF SOLENOID VALVE 28
(FOR SHIFT-UP)

S6 : TURNING ON SOLENOID VALVE 28
(FOR SHIFT-DOWN)

S8 : TURNING ON SOLENOID VALVE 30
(NON-RESTRICTED FEED : DUTY CYCLE = 100 %)

S10: TURNING OFF SOLENOID VALVE 30
(RESTRICTED FEED : DUTY CYCLE = 0 %)

S12: TURNING OFF SOLENOID VALVE 30
(NON-RESTRICTED DISCHARGE : DUTY CYCLE = 0 %)

S14: TURNING ON SOLENOID VALVE 30
(RESTRICTED DISCHARGE : DUTY CYCLE = 100 %)

S15: $|E'| - |E| \gtreqless 0$ ?

S20: TURNING ON AND OFF SOLENOID VALVE 30 FOR
CONTROLLING ITS DUTY CYCLE

METHOD AND APPARATUS FOR CONTROLLING HYDRAULICALLY-OPERATED CONTINUOUSLY VARIABLE TRANSMISSION OF BELT-AND-PULLEY TYPE

BACKGROUND OF THE INVENTION

The present invention relates generally to a method and an apparatus for controlling a hydraulically-operated continuously variable transmission of belt-and-pulley type. More particularly, the invention is concerned with such controlling method and apparatus which permit a change in speed ratio of the transmission with improved response.

A continuously variable transmission of belt-and-pulley type is known, which comprises an input shaft operatively connected to a drive source such as an engine of a vehicle, an output shaft disposed parallel to the input shaft, a first variable-diameter pulley including a pair of opposed rotary members mounted on the input shaft, a second variable-diameter pulley including another pair of opposed rotary members mounted on the output shaft, and a transmission belt connecting the first and second variable-diameter pulleys. The effective diameter of each variable-diameter pulley is changed by axial movements of the rotary members toward and away from each other by a hydraulic cylinder. In a generally used hydraulic arrangement of such a transmission of belt-and-pulley type, one of the first and second hydraulic cylinders for changing the effective diameter of the first and second variable-diameter pulleys is always fed with a predetermined flow of pressurized fluid supplied from a suitable hydraulic pressure source (pressure generating device). In the meantime, the hydraulic flow to be supplied to or discharged from the other hydraulic cylinder is varied so as to change the effective diameter of the associated pulley. For example, the first hydraulic cylinder is used to positively change the effective-diameter of the first pulley, while the second hydraulic cylinder is fed with a hydraulic line pressure just sufficient to give a suitable tension to the transmission belt so that the effective diameter of the second pulley is changed following the changing effective diameter of the first pulley, whereby the speed ratio between the input and output shafts of the transmission is continuously variable. When this type of variable transmission is used for a vehicle, the speed ratio of the transmission is changed according to changing running conditions of the vehicle, so that the fuel economy of the vehicle is improved.

In a known controlling apparatus for such a variable transmission, there is generally used a valve device which has three states: a first state at which the predetermined hydraulic pressure is supplied to the first hydraulic cylinder; a second state at which the hydraulic pressure is discharged from the first hydraulic cylinder; and a third state at which the supply and discharge of the hydraulic pressure to and from the first hydraulic cylinder are restrained. In this arrangement, the speed ratio of the transmission is varied at a fixed rate of shifting. Accordingly, it is not possible to control the transmission such that the actual speed ratio is varied with a satisfactory response to a change in a target speed ratio which is continuously determined to establish running conditions of the vehicle desired by the driver, with mximum fuel economy. The controlling apparatus may suffer a delayed response of the actual speed ratio to the target speed ratio, or a hunting trouble, particularly when the desired vehicle speed is abruptly changed.

Stated in more detail, the known controlling arrangement for a variable transmission of belt-and-pulley type is not completely satisfactory in its operating reliability and accuracy in controlling a flow of a pressurized working fluid for changing the speed ratio of the transmission. For example, a controlling arrangement in the prior art is adapted to control the actual speed of a vehicle engine so as to coincide with a target engine speed which is determined based on an opening angle of a throttle valve (which represents a currently required output of the engine). In such an arrangement, the actual engine speed tends to be fluctuated in the vicinity of the determined target engine speed, i.e., a hunting or overshooting trouble will take place in the process of controlling the actual engine speed in conformity with the target speed. This trouble will cause undesired oscillation or vibration of the engine, which may possibly degrade the drivability of the vehicle.

It is possible that the valve device used in the controlling apparatus described above be replaced by a proportioning flow control valve which is capable of continuously changing its opening angle for continuous change of a fluid flow through the valve. However, such a flow control valve inherently suffers a variation in the flow to be controlled, due to presence of foreign matters in the working fluid or due to inaccuracy of manufacture of the valve. Thus, a sufficiently accurate control of the variable transmission is not necessarily obtained by such a flow control valve.

SUMMARY OF THE INVENTION

It is therefore an object of the present invention to provide a method of controlling a hydraulically-operated continuously variable transmission of belt-and-pulley type, which permits the speed ratio of the transmission to be controlled with a relatively high response and minimum control variation.

Another object of the invention is to provide a hydraulic control system suitable for practicing the method indicated above.

According to the present invention, there is provided a hydraulic control method for controlling a speed ratio of a hydraulically-operated continuously variable transmission having (1) an input shaft, (2) an output shaft, (3) a first and a second variable-diameter pulley mounted on the input and output shafts, respectively, (4) a transmission belt connecting the first and second variable-diameter pulleys, and (5) a pair of hydraulic cylinders for changing an effective diameter of the first and second variable-diameter pulleys, respectively, one of the hydraulic cylinders being controlled by a speed-ratio control valve assembly which is selectively placed in one of three states of operation consisting of a first state in which a pressurized fluid is fed to said one of the hydraulic cylinders, a second state in which the fluid is discharged from said one hydraulic cylinder, and a third state in which the feed or discharge flow of the fluid to or from said one hydraulic cylinder is restricted, wherein the improvement comprises:

a step of establishing the first and third states in an alternate fashion while changing a ratio of an operating time in the first state to that in the third state, for controlling a rate of flow of the fluid into said one hydraulic cylinder; and a step of establishing the second and third states in an alternate fashion while changing a ratio of an operating time in the second state to that in the third state, for controlling a rate of flow of the fluid from said one hydraulic cylinder, whereby the speed ratio of the continuously variable transmission is continuously varied by said one hydraulic cylinder under control of the speed-ratio control valve assembly.

In the hydraulic control method of the invention described above, the flows of the fluid to be fed into and discharged from one of the two cylinders which serves to change the effective diameter of one of the pulleys, can be continuously changed, whereby the speed ratio of the transmission is continuously varied with an improved response. In other words, the fluid flows into and from the cylinder are controlled by cyclic alternate ON-OFF valving actions of the valve assembly between its first and third states, and between its second and third states, respectively. This ON-OFF valving operation permits precise regulation of the fluid flows with high response characteristics similar to those of a flow control valve of proportioning type. In the case where the instant method is applied to a transmission of a vehicle, the speed ratio of the transmission is easily controlled for minimum fuel consumption and maximum drivability of the vehicle. Further, the ON-OFF valving operation in the two different states or positions eliminates a chance of such a valve sticking trouble that a proportioning flow control valve tends to suffer. That is, the instant method using an ON-OFF switching valve device assures stable control of the fluid flow, without variation in the controlled fluid flow due to presence of foreign matters in the working fluid, or due to manufacturing inaccuracy of the valve. Further, the instant method permits the use of a hydraulic control system which is less costly because of simple ON-OFF valving operations.

According to another aspect of the method of the invention, the variable transmission is used for connecting an engine to drive wheels of a vehicle. The hydraulic control method according to this aspect comprises the steps of:

determining a target value of a variable to be controlled, e.g., a target speed of the engine or a target speed ratio of the transmission, based on a currently required output of the engine and according to a predetermined relation between the target value of the variable and the required engine output;

operating the speed-ratio control valve assembly so that a difference between the target value and an actual value of the variable is reduced;

the above step of operating the speed-ratio control valve assembly including a step of establishing the previously defined first and third states in an alternate fashion while changing a ratio of an operating time in the first state to that in the third state in response to a variation in said difference, for controlling a rate of flow of the fluid into the one hydraulic cylinder, and further including a step of establishing the previously defined second and third states in an alternate fashion while changing a ratio of an operating time in the second state to that in the third state in response to the variation in said difference, for controlling a rate of flow of the fluid from the one hydraulic cylinder.

In the method according to the above respect of the invention, the rate of variation in the speed ratio of the transmission may be continuously decreased as the difference between the target and actual values of a variable, e.g., a speed of the engine, is reduced. Conversely, the rate of variation in the speed ratio may be continuously increased as the difference is increased. In this manner, the actual speed ratio of the transmission is controlled so as to coincide with an optimum speed ratio. Hence, for example, the present method is capable of preventing a delay of the actual engine speed in following the target engine speed, or an overshoot of the speed-ratio control valve assembly, and particularly effective to protect the control valve assembly against a hunting trouble that the actual engine speed swings on both sides of the target engine speed.

According to the invention, there is also provided a hydraulic control system for controlling a speed ratio of a hydraulically-operated continuously variable transmission of a vehicle, having (1) an input shaft operatively connected to an engine of the vehicle, (2) an output shaft operatively connected to drive wheels of the vehicle, (3) a pair of variable-diameter pulleys mounted on the input and output shafts, respectively, (4) a transmission belt connecting the pair of variable-diameter pulleys, and (5) a pair of hydraulic cylinders for changing an effective diameter of the pair of pulleys, respectively, the hydraulic control system including a speed-ratio control valve assembly associated with one of said hydraulic cylinders, the control valve assembly being selectively placed in one of three states of operation consisting of a first state in which a pressurized fluid is fed to said one of the hydraulic cylinders, a second state in which the fluid is discharged from said one hydraulic cylinder, and a third state in which the feed or discharge flow of the fluid to or from said one hydraulic cylinder is restricted, said hydraulic control system comprising:

detecting means for detecting an actual value of a variable to be controlled, such as a speed of the engine or a speed ratio of the transmission;

first determining means for determining a target value of said variable, based at least on a currently required output of the engine and according to a predetermined relation between the target value of the variable and the required output of the engine;

second determining means for determining a difference between said target value and actual value of said variable; and control means for controlling the operation of the speed-ratio control valve assembly so that said difference is reduced, the control means operating the control valve assembly to establish the first and third states in an alternate fashion while changing a ratio of an operating time in the first state to that in the third state in response to a variation in said difference, for controlling a rate of flow of the fluid into said one hydraulic cylinder, and to establish the second and third states in an alternate fashion while changing a ratio of an operating time in the second state to that in the third state in response to said variation in said difference, for controlling a rate of flow of the fluid from said one hydraulic cylinder, whereby the speed ratio of the continuously variable transmission is continuously varied by said one hydraulic cylinder and the speed-ratio control valve assembly under control of the control means.

The hydraulic control system constructed as described above has the same features and advantages as previously discussed in connection with the methods of the present invention.

BRIEF DESCRIPTION OF THE DRAWING

The above and other objects, features and advantages of the present invention will be better understood from reading the following description of the preferred embodiments taken in conjunction with the accompanying drawing in which:

FIG. 8 and 8a are flow charts illustrating events of operation controlled by the hydraulic control system of the invention;

DETAILED DESCRIPTION OF THE PREFERRED EMBODIMENTS

Referring to the accompanying drawing, preferred embodiments of the invention will be described in detail.

Figure 1:
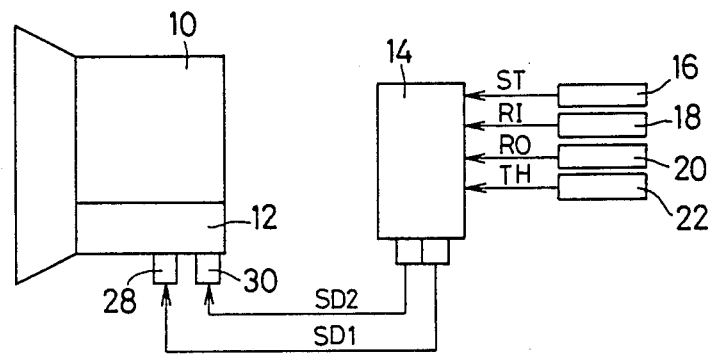
FIG. 1 is a schematic diagram showing a general arrangement of a continuously variable transmission of belt-and-pulley type equipped with one embodiment of a hydraulic control system of the present invention.

There is shown in FIG. 1 a hydraulically-operated continuously variable transmission 10 of belt-and-pulley type (hereinafter referred to as "transmission 10") which is operatively connected to an engine and drive wheels of an automotive vehicle to transmit an output of the engine to the drive wheels, at a controlled speed ratio (ratio of a rotating speed of an input shaft over that of an output shaft). The transmission 10 is equipped with a hydraulic control system of the invention which includes a hydraulic control device 12 for shifting or changing the speed ratio. Also shown in FIG. 1 is a speed-ratio controller 14 which is connected to a throttle sensor 16 disposed on a throttle valve (not shown), a first rotation sensor 18, a second rotation sensor 20, and a transaxle oil-temperature sensor 22, so that the speed-ratio controller 14 receives, from the respective sensors 16, 18, 20 and 22, a THROTTLE signal ST representing an opening angle of the throttle valve (i.e., representing a currently required output of the engine), a ROTATION signal RI representing a rotating speed of a first variable-diameter pulley 24 of the transmission 10 (representing an actual speed of the engine), a ROTATION signal RO representing a rotating speed of a second variable-diameter pulley 26 of the transmission 10, and a TEMPERATURE signal TH representing an oil temperature of a transaxle of the vehicle. Based on these signals, the controller 14 recognizes the currently required running conditions of the vehicle (engine) and determines a target value of a variable to be controlled, such as a target speed of the engine or a target speed ratio of the transmission 10, primarily based on the requirement for establishing the currently required running condition of the vehicle with minimum fuel consumption (for maximum fuel economy). The controller 14 feeds DRIVE signals SD1 and SD2 to pilot solenoid valves 28 and 30 provided within the hydraulic control device 12. The DRIVE signals SD1 and SD2 are adapted such that an actual value of the variable to be controlled, such as an actual speed of the engine or an actual speed ratio of the transmission 10, conicides with the determined target value.

Figure 2:
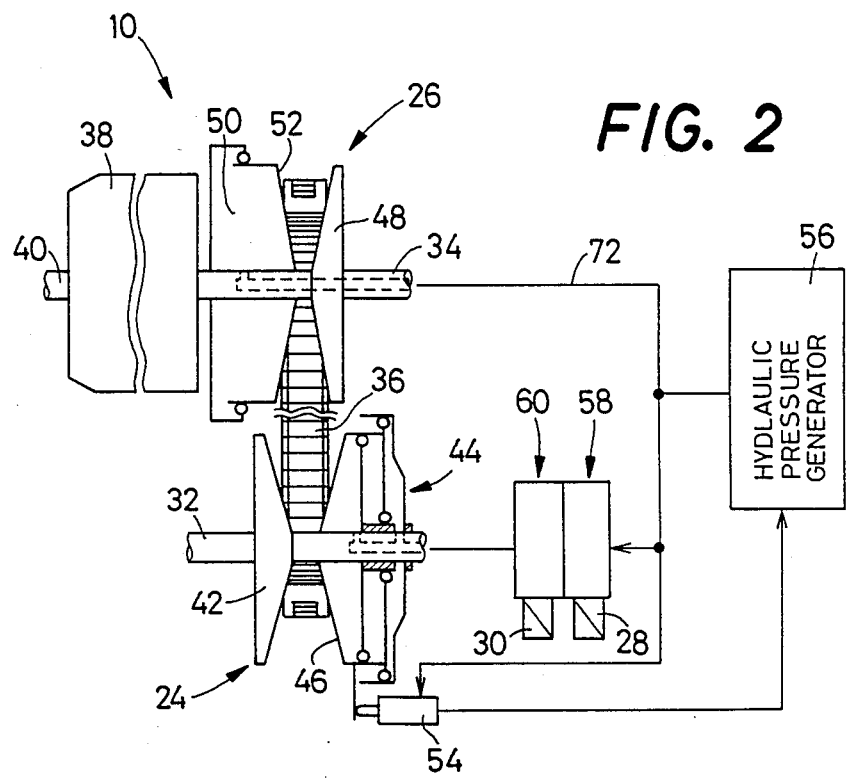
FIG. 2 is a illustrative view of essential parts of the arrangement of FIG. 1.

Specific examples of the transmission 10 and the hydraulic control device 12 are illustrated in FIG. 2. The transmission 10 comprises an input shaft 32, an output shaft 34, a first variable-diameter pulley 24 mounted on the input shaft 32, a second variable-diameter pulley 26 mounted on the output shaft 34, and a transmission belt 36 connecting the first and second variable-diameter pulleys 24 and 26. A torque of the engine imparted to the input shaft 32 is transmitted to the output shaft 35 via the belt 36, and further to another output shaft 40 via a gear device 38 which includes a train of gears such as planetary gears for changing a direction of rotation. The output shaft 40 of the gear device 38 is operatively connected to drive wheels of the vehicle via a differential gear. The first variable-diameter pulley 24 includes a stationary rotor 42 fixed to the input shaft 32, and an axially movable rotor 46 which fits on the input shaft 32 axially slidably but not rotatably relative to the shaft 32. The movable rotor 46 is moved axially on the input shaft 32 by a hydraulic pressure applied to a first hydraulic cylinder 44. By changing the hydraulic pressure, the width of a Vee groove defined by the stationary and movable rotors 42 and 46 is changed, whereby the effective diameter of the first pulley 24 engaging the belt 36 is accordingly changed. Similarly, the second variable-diameter pulley 26 includes a stationary rotor 48 fixed to the output shaft 34, and an axially movable rotor 52 which fits on the output shaft 34 axially slidably but not rotatably relative to the shaft 34. The movable rotor 52 is moved axially on the output shaft 34 by a hydraulic pressure applied to a second hydraulic cylinder 50. By changing the hydraulic pressure, the width of a Vee groove defined by the stationary and movable rotors 48 and 52 is changed, whereby the effective diameter of the second pulley 26 engaging the belt 36 is accordingly changed. The first hydraulic cylinder 44 is of double-piston construction, and given a greater thrust than the second hydraulic cylinder 50 even when the same level of pressure is applied to these hydraulic cylinders 44, 50.

The hydraulic control device 12 comprises: (1) a hydraulic pressure generator 56 which generates a hydraulic line pressure which is determined by SPEED-RATIO PRESSURE signal produced from a sensing valve 54, and by an angle of opening of the throttle valve (not shown) which is disposed in an intake manifold of an engine, the SPEED-RATIO PRESSURE signal representing an actual speed ratio of the transmission 10 as described later; (2) a shift-direction switching valve unit 58 which is adapted to change a direction in which the movable rotor 46 is shifted relative to the stationary rotor 42, i.e., a direction of variation in the speed ratio of the transmission 10, such that the switching action of the valve unit 58 selectively permits the supply of the pressurized fluid of the line pressure to the first hydraulic cylinder 44 or the discharge of the fluid out of the hydraulic cylinder 44, for movement of the movable rotor 46 in the selected one of opposite directions along the axis of the input shaft 32; and (3) a shift-speed control valve unit 60 which is adapted to control a rate of flow of the pressurized fluid supplied to or discharged from the first hydraulic cylinder 44, and thereby control a rate of variation in the speed ratio of the transmission 10.

Figure 3:
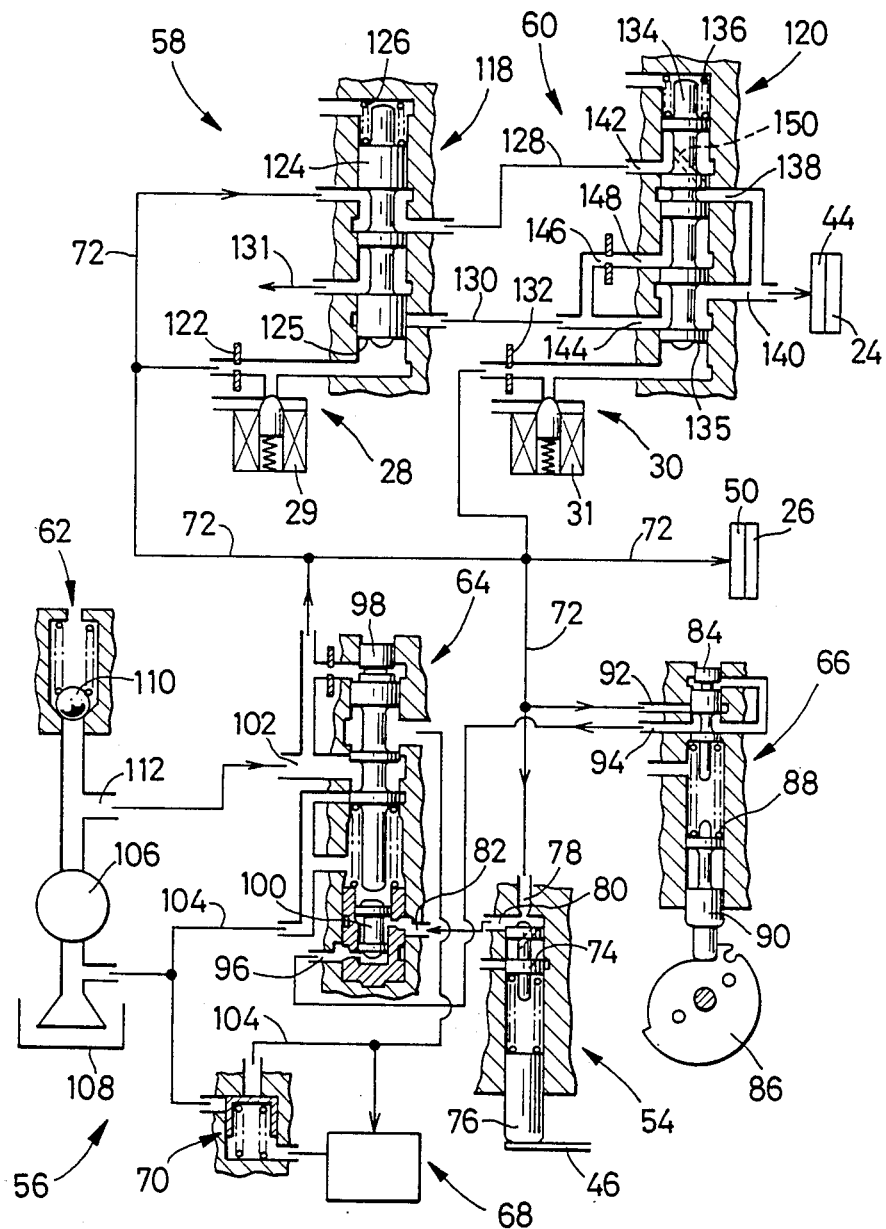
FIG. 3 a fragmentary view in cross section of a hydraulic control device used in the arrangement of FIGS. 1 and 2.

Referring to FIG. 3, the hydraulic control device 12 comprising the above indicated hydraulic pressure generator 56 and valve units 58, 60 will be described in more detail.

The hydraulic pressure generator 56 includes a pumping assembly 62, a regulator valve 64, a throttle sensing valve 66, a cooler 68, and a cooler-pressure valve 70, and is arranged to supply, through conduits 72, the shift-direction switching valve unit 58, shift-speed control valve unit 60, sensing valve 54, and other elements with a hydraulic line pressure which is varied depending upon the detected throttle opening angle and actual speed ratio of the transmission 10.

Figure 4:
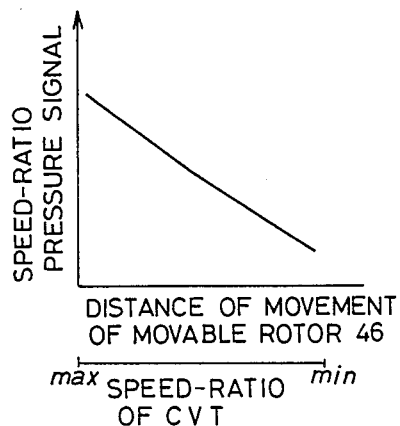
FIG. 4 is a graph showing a relation between a SPEED-RATIO PRESSURE signal from a sensing valve shown in FIG. 3, and a distance of movement of a movable rotor of the transmission.

The sensing valve 54 includes a spool 74, and a spring-loaded sensing piston 76 which is moved together with the movable rotor 46 of the first variable-diameter pulley 24, to bias the spool 74 via the spring with a force corresponding to the actual speed ratio of the transmission 10. Stated more specifically, an area of communication between an input port 78 and an output port 80 of the valve 54 is changed according to a distance of the movement of the spool 74 which is changed as a function of the actual speed ratio of the transmission 10. Therefore, the pressure output from the output port 80, which is applied to an input port 82 of a regulator valve 64, serves as the previously indicated SPEED-RATIO PRESSURE signal whose level is changed in relation to the movement of the spool 74 as illustrated in FIG. 4.

Figure 5:
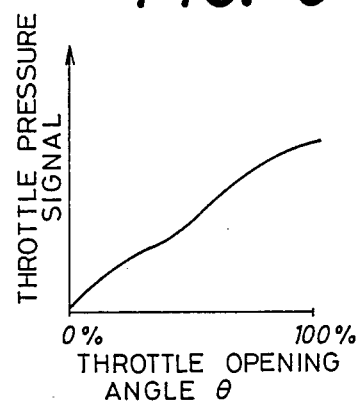
FIG. 5 is a graph showing a relation between a THROTTLE PRESSURE signal from a throttle sensing valve shown in FIG. 3, and an angle of opening of a throttle valve.

The throttle sensing valve 66 includes: a spool 84; a cam 86 rotated as a function of an opening angle of the throttle valve (not shown); a piston 90 engaging the cam 86 and moved as the cam 86 is rotated; and a spring 88 interposed between the spool 84 and the piston 90. In this arrangement, the spool 84 is moved while being biased by the spring 88 whose biasing force is changed as a function of the opening angle of the throttle valve (not shown) which represents a currently required output of the engine. An area of communication between an input port 92 of the valve 66 and the conduit 72 is adjusted according to the movement of the spool 84, whereby the pressure output from an output port 94 serves as a THROTTLE PRESSURE signal whose level is changed in relation to the opening angle of the throttle valve (not shown), as illustrated in FIG. 5. This pressure signal (pressure output from the output port 94) is applied to an input port 96 of the regulator valve 64.

Figure 6:
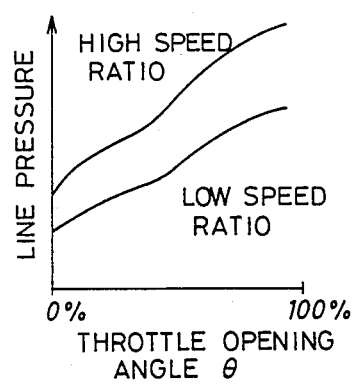
FIG. 6 is a graph showing a relation between a line pressure regulated by a regulator valve shown in FIG. 3, and the opening angle of the throttle valve.

The regulator valve 64 includes a spool 98, and a valve plunger 100 which is actuated by the previously discussed SPEED-RATIO PRESSURE signal and THROTTLE PRESSURE signal (pressure outputs from the output ports 80 and 94), to control the movement of the spool 98 and thereby adjust an area of communication between a line port 102 connected to the pumping assembly 62, and a return conduit 104 connected to the cooler-pressure control valve 70, whereby the line pressure of the conduits 72 communicating with the line port 102 is adjusted as illustrated in FIG. 6. Thus, the regulator valve 64 serves to regulate the line pressure used by the transmission 10, so that the pressure is held at a minimum level required to operate the transmission 10 without a slip of the belt 36. This line pressure regulation to the minimum required level is intended to minimize a power loss of the engine which is used to drive a pump 106 of the pumping assembly 62, and to thereby maximize the fuel economy of the vehicle.

The pump 106 pumps up the working fluid returned to a reservoir 108 from the cooler 68, sensing valve 54, throttle sensing valve 66, shift-direction switching valve 58, shift-speed control valve 60, etc. via drain conduits (not shown). The pressurized fluid from the pump 106 is supplied to the regulator valve 64 via a conduit 112 in which a relief valve 110 is incorporated.

The previously described shift-direction switching valve unit 58 and shift-speed control valve unit 60, which cooperate to constitute a speed-ratio control valve assembly in this embodiment, include the solenoid valve 28 and a spool valve 118, and the solenoid valve 30 and a spool valve 120, respectively. The solenoid valves 28 and 30 are fed with the line pressure through the conduits 72. The solenoid valve 28 is provided with a solenoid 29, and an orifice 122 disposed in a passage communicating with the conduit 72. The spool valve 118 includes a spool 124 having a pressure receiving end face 125, and a spring 126 biasing the spool 124 at its end opposite to the end face 125. When the solenoid valve 28 is in the closed position, i.e., when the solenoid 29 is OFF, the line pressure exerted through the orifice 122 as a pilot pressure is applied so as to act on the end face 125 of the spool 124, whereby the spool 124 is moved against a biasing force of the spring 126. When the solenoid valve 28 is in the open position with the solenoid 29 in the ON position, the pilot pressure (line pressure through the orifice 122) is released through the solenoid valve 28 in the open position, and through a conduit downstream of the orifice 122. Consequently, the spool 124 is moved with a biasing force of the spring 126. In other words, the spool 124 is moved between its FEED and DISCHARGE positions (which will be described in detail) in response to the operation of the solenoid valve 28 which acts as a pilot valve for the spool valve 118.

When the spool 124 is placed in its FEED position on the side of the spring 126, the conduit 72 and a feed conduit 128 are held in communication with each other while the communication between a drain conduit 131 and a discharge conduit 130 is inhibited. Thus, in the FEED position, the line pressure is supplied to the first hydraulic cylinder 44 through the spool valve 118, feed conduit 128 and spool valve 120. When the spool 124 is placed in its DISCHARGE position on the side of the end face 125, the communication between the conduits 72 and 128 is inhibited while the drain and discharge conduits 131 and 130 are held in communication. Thus, in the DISCHARGE position, the pressure in the first hydraulic cylinder 44 is discharged through the spool valve 120, discharge conduit 130 and spool valve 118.

Like the solenoid valve 28, the solenoid valve 30 is provided with a solenoid 31, and an orifice 132 disposed in a passage communicating with the conduit 72. The spool valve 120 includes a spool 134 having a pressure receiving end face 135, and a spring 136 biasing the spool 124 at its end opposite to the end face 135. When the solenoid valve 30 is in the closed position, i.e., when the solenoid 31 is OFF, the line pressure exerted through the orifice 132 as a pilot pressure is applied so as to act on the end face 135 of the spool 134, whereby the spool 134 is moved against a biasing force of the spring 136. When the solenoid valve 30 is in the open position with the solenoid 31 in the ON position, the pilot pressure (line pressure through the orifice 132) is released and the spool 134 is moved with a biasing force of the spring 136.

The spool valve 120 has an output port 138 and an input port 140 connected to the hydraulic cylinder 44, and a feed port 142 connected to the feed conduit 128, and a discharge port 144 connected to the discharge conduit 130. The spool valve 120 further has a reducing port 148 connected to the discharge conduit 130 via an orifice 146. When the solenoid 29 is in the OFF position and the spool 134 is placed in its FIRST position on the side of the spring 136, the input and reducing ports 140, 148 are disconnected and the input and discharge ports 140, 144 are connected while the output and feed ports 138, 142 are connected through an orifice formed in the spool 134. When the solenoid 29 is in the ON position and the spool 134 is placed in its SECOND position, the output and feed ports 138, 142 are connected and the input and reducing ports 140, 144 are connected while the input and discharge ports 140, 144 are disconnected.

As described above, the spool 134 of the shift-speed control valve unit 60 is operated between its FIRST and SECOND positions in response to the operation of the solenoid valve 30 which acts as a pilot valve. In this embodiment, the valve unit 60 is used for controlling the rates of both feed and discharge flows of the hydraulic fluid into and out of the first hydraulic cylinder 44.

For more clarification, reference is now made to Table 1 below to explain the operating states of the speed-ratio control valve assembly consisting of the valve units 58 and 60.

As shown in Table 1, there are four possible combinations of the operating positions of the solenoids 29 and 31. While the spool 124 of the shift-direction switching valve unit 58 is placed in the FEED position with the solenoid 29 in the OFF position, the flow of the pressurized fluid to be fed from the feed conduit 128 to the output port 138 and then to the hydraulic cylinder 44 is restricted through the orifice 150 when the spool 134 of the shift-speed control valve unit 60 is placed in the FIRST position with the solenoid 31 in the OFF position. However, the fluid flow into the cylinder 44 is not restricted when the spool 134 is in the SECOND position with the solenoid in the ON position. Similarly, while the spool 124 is in the DISCHARGE position with the solenoid 29 in the ON position, the flow of the fluid to be discharged from the cylinder 44 to the discharge conduit 130 through the input port 140 is restricted through the orifice 146 when the spool 134 is placed in the SECOND position with the solenoid 31 in the ON position, but not restricted when the spool 134 is in the FIRST position.

TABLE 1

| Solenoids | | Positions of Spools | | Functions of Spool | STATE of Speed-Ratio Control |
|---|---|---|---|---|---|
| 29 | 31 | 124 | 134 | Valve 120 | Valve Assembly |
| OFF | OFF | FEED | FIRST | Restricted Feed | 3rd STATE |
| OFF | ON | FEED | SECOND | Non-Restricted Feed | 1st STATE |
| ON | OFF | DISCHARGE | FIRST | Non-Restricted Discharge | 2nd STATE |
| ON | ON | DISCHARGE | SECOND | Restricted Discharge | 3rd STATE |

As described above and indicated in Table 1, the flows of the pressurized fluid to be fed to and discharged from the cylinder 44 are either restricted or non-restricted depending upon the currently established operating position (FIRST or SECOND) of the shift-speed control valve unit 60. In this manner, the valve unit 60 controls the rate of increase or decrease in the speed ratio of the transmission 10, that is, the rate of shift-up or shift-down movement of the movable rotor 46 for changing the effective diameter of the variable-diameter pulley 24. The valve unit 60 is actuated through ON-OFF operation of the associated solenoid valve 30, more precisely through energization and de-energization of the solenoid 31. The operation of this solenoid 31 is controlled by the previously indicated speed-ratio controller 14.

In summary, the speed-ratio control valve assembly consisting of the shift-direction switching valve unit 58 and the shift-speed control valve unit 60 has three operating states as indicated in Table 1. In the FIRST STATE, the pressurized fluid is fed to the hydraulic cylinder 44 without restriction. In the SECOND STATE, the fluid in the hydraulic cylinder 44 is discharged without restriction. In the THIRD STATE, the pressurized fluid to be fed to or discharged from the hydraulic cylinder 44 is restricted. The speed-ratio control valve assembly is selectively placed in one of these three operating states according to DRIVE signals SD1 and SD2 which are produced from the speed-ratio controller 14 to actuate the solenoids 29 and 31. While the solenoid 29 is in the OFF position, the solenoid 31 is turned ON and OFF at a duty cycle determined by the DRIVE signal SD2, to alternately establish the FIRST and THIRD STATES, so that the shift-up rate (rate of decrease in the speed ratio) of the transmission 10 is controlled. Similarly, while the solenoid 29 is in the ON position, the ON-OFF operation of the solenoid 31 is controlled at a duty cycle also determined by the DRIVE signal SD2, to alternately establish the SECOND and THIRD STATES, so that the shift-down rate (rate of increase in the speed ratio) of the transmission 10 is controlled.

The speed-ratio controller 14 is constituted by a microcomputer known as an ECV, and adapted to receive the THROTTLE signal ST representing an amount of operation (opening angle) of the throttle valve (not shown) which in turn represents the currently required output of the engine. Based on the THROTTLE signal ST, the controller 14 determines a target value of a variable to be controlled such as a target speed $N_D$ of the engine, primarily for the purpose of obtaining the currently required output of the engine with minimum fuel consumption. The variable to be controlled may be a speed ratio of the transmission 10, but the engine speed $N_D$ is used as a variable to be controlled in this specific embodiment.

Figure 7:
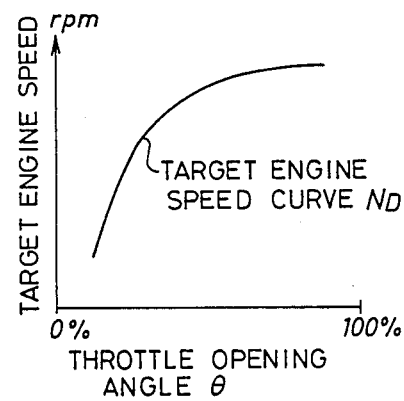
FIG. 7 is a graph showing an example of a curve of a target engine speed as a function of the opening angle of the throttle valve.

The speed-ratio controller 14 stores data representing a functional equation or data map which gives an optimum curve of the target engine speed $N_D$ in relation to the opening angle $\theta$ of the throttle valve, as shown in the graph of FIG. 7. The target engine speed $N_D$ is determined based on the THROTTLE signal ST and according to the relation represented by the stored functional equation or data map. In this connection, the THROTTLE signal ST may be replaced by a signal which is produced by an acceleration sensor and which represents an amount of operation of the accelerator pedal of the vehicle. The controller 14 also receives the ROTATION signal RI which represents the rotating speed of the first variable-diameter pulley 24. That is, the controller 14 finds an actual engine speed $N_A$ based on the ROTATION signal RI. The controller 14 comprises calculating means for comparing the target actual engine speeds $N_D$ and $N_A$ and calculating an error $E=N_D-N_A$ (difference between the values $N_D$ and $N_A$).

The controller 14 further comprises drive control means for applying drive current pulses (in the form of the DRIVE signal SD2) to the solenoid valve 30 to turn ON and OFF (energize and deenergize) the solenoid 31 while the error E is held within a predetermined range. This drive control means changes the duty cycle (percent) of the ON-OFF current pulses according to the magnitude of the error E, thereby varying the ratio of energization time to deenergization time of the solenoid 31. Accordingly, the duty cycle of the valve unit 60, in other words, the ratio of the FIRST position time of the spool 134 to the SECOND position time is controlled such that the speed ratio of the transmission 10 is decreased as the error E is reduced.

The duty cycle of the above mentioned ON-OFF current pulses may be varied by changing a pulse width while the frequency is held constant, or by changing the pulse frequency while the pulse width is held constant. The substantive arrangement and function of the drive control means and calculating means of the controller 14 will be better understood and become more apparent from the following description of the operation of the hydraulic control system of the present embodiment of the invention arranged as described hitherto.

Figure 8:
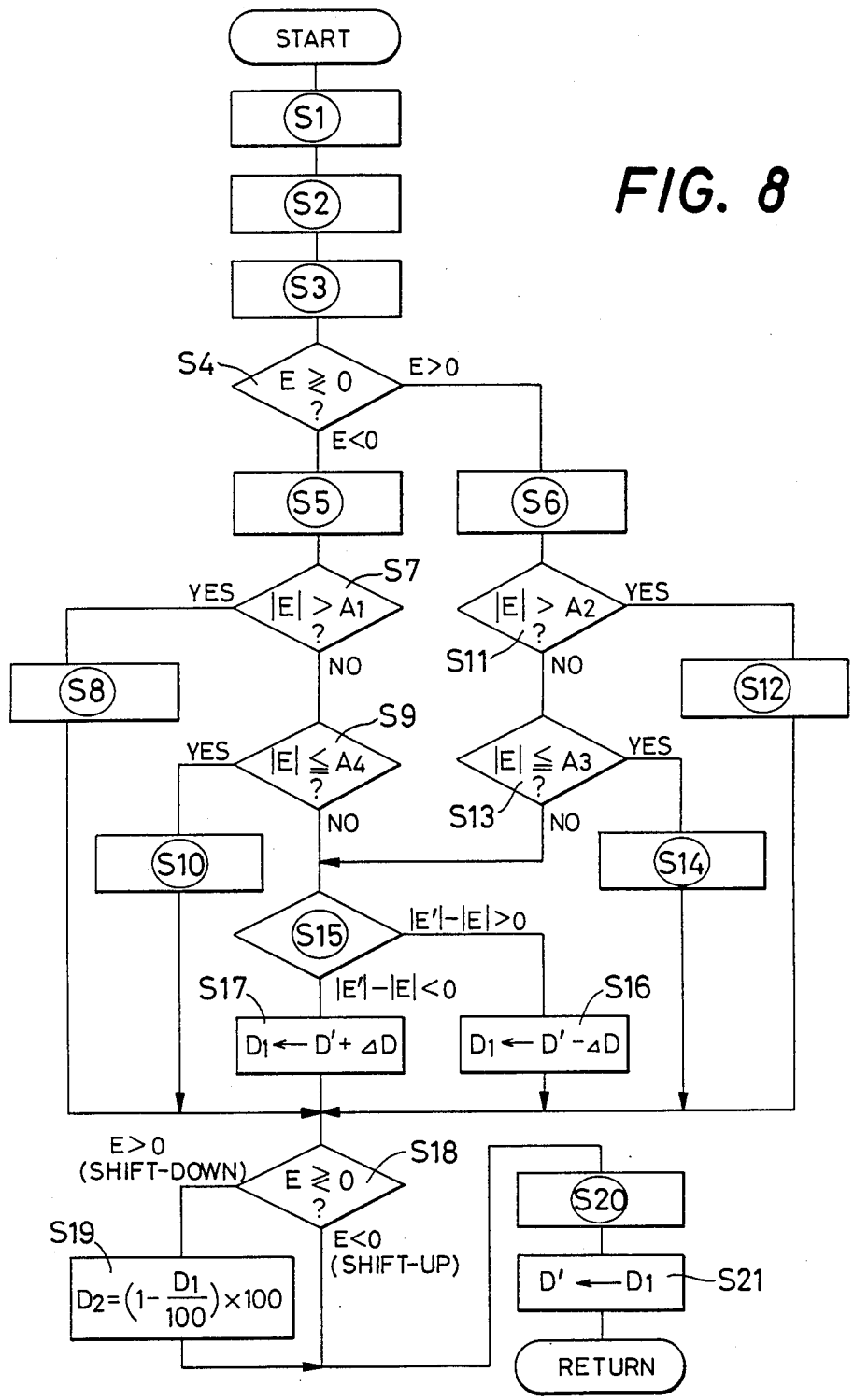

Referring now to the flow chart of FIG. 8, the operation of the instant hydraulic control system will be described. The flow chart also illustrates one embodiment of the hydraulic control method of the invention.

At first, the speed-ratio controller 14 executes step S1 to read current throttle opening angle $\theta$ and current or actual engine speed $N_A$, based on the THROTTLE signal ST and the ROTATION signal R1 of the first pulley 24. In the following step S2, the controller 14 determines a target engine speed $N_D$ (as a target value of a variable to be controlled) corresponding to the throttle opening angle $\theta$. Step S2 is followed by step S3 wherein the control error E ($N_D-N_A$) between the target and actual engine speeds $N_D$ and $N_A$ is calculated. Subsequently, the controller 14 judges in step S4 whether the calculated error E is positive or negative.

If the control error E is negative, it means that the actual engine speed $N_A$ is higher than the determined target engine speed $N_D$, i.e., unnecessarily high. In this case, therefore, it is required to reduce the speed ratio of the transmission 10, i.e., to shift up the transmission 10. As shown in FIG. 8, when the error E is negative, step S4 is followed by step S5 wherein the solenoid valve 28 is turned (held) OFF (no DRIVE signal SD1 is applied to the solenoid 29), and the spool 124 of the spool valve 118 is moved to (held in) its FEED position of FIG. 3 at which the pressurized fluid in the conduit 72 is fed to the first hydraulic cylinder 44 through the spool valve 118, feed conduit 128, and spool valve 120. Consequently, the movable rotor 46 of the first variable-diameter pulley 24 is moved toward the stationary rotor 42, with a result of increasing the effective diameter of the pulley 24 and thereby shifting up the transmission 10.

If the error E is positive, it means that an excessive load is being applied to the engine. In this case, it is required to increase the speed ratio of the transmission 10, viz., to shift down the transmission 10. Therefore, the controller 14 goes to step S6 wherein the solenoid valve 28 is turned ON with the DRIVE signal SD1 applied to the solenoid 29 and the spool 124 is moved to its DISCHARGE position at which the discharge conduit 130 is put into communication with the drain conduit 131. Consequently, the pressurized fluid in the hydraulic cylinder 44 is discharged, whereby the movable rotor 46 of the first pulley 24 is moved away from the stationary rotor 42 and the effective diameter of the first pulley 24 is reduced. Thus, the transmission 10 is shifted down.

Figure 9:
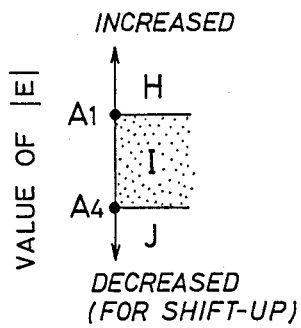
FIGS. 9 and 10 are illustrations explaining control operations of a shift-speed control valve unit according to ranges of an error value between the target and actual engine speeds.
Figure 10:
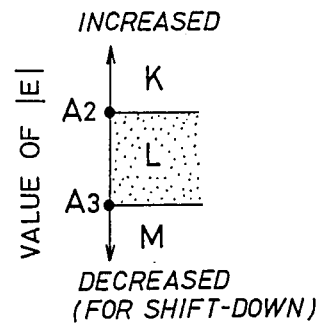

In order to evaluate the absolute value $|E|$ of the error $E=N_D-N_A$, the controller 14 stores data representing critical values A1 and A4 which define three ranges H, I and J of the value $|E|$, as shown in FIG. 9, which ranges are applicable when step S5 for shifting up the transmission 10 is selected, and data representing critical values A2 and A3 which define three ranges K, L and M of the value $|E|$, as shown in FIG. 10, which ranges are applicable when step S6 for shifting down the transmission 10 is selected. The critical values A1, A2, A3 and A4 are determined so that the following relations are satisfied:

$$A1 \geq A4;\ A2 \geq A3;\ \text{and}\ A3 \geq A4$$

The basis for the above relations and the use of different critical values for the shift-up and shift-down operations resides in the general recognition that the response of speed-ratio variation is faster in the case where the transmission 10 is shifted down by reducing the effective diameter of the first pulley 24, than in the case where the transmission 10 is shifted up by increasing the effective diameter of the first pulley 24. That is, it is desired to start restraining the rate of variation in the speed ratio of the transmission 10 at an earlier point of time in the former case, than in the latter case.

Going back to the shift-up operation wherein the shift-direction switching valve unit 58 is held in the FEED position in step S5, the controller 14 then goes to step S7 to judge whether the value $|E|$ is greater than the value A1 or not. If the value $|E|$ is greater than the value A1, then the controller 14 goes to step S8 wherein the DRIVE signal SD2 is applied to the solenoid 31 of the solenoid valve 30 whereby the solenoid 31 is turned ON and the valve 30 is held in the open position. In this condition, it is considered that the duty cycle of the drive current (solenoid valve 30) is 100%.

Described in more detail, when the solenoid 31 is turned ON, the pilot pressure (line pressure) which has been applied to the end face 135 of the spool 134 is released, whereby the spool 134 is moved by the spring 136 to its SECOND position. As a result, the line pressure of the fluid from the conduit 72 through the spool valve 118 in the FEED position and through the feed conduit 138 is applied to the output port 138 without restriction of the fluid flow through the spool valve 120, whereby the pressurized fluid is fed into the first hydraulic cylinder 44 at a relatively high flow rate. In this instance, the fluid flow into the cylinder 44 is held at a level Q1 shown in FIG. 11, and accordingly the effective diameter of the first pulley 24 is rapidly increased. Hence, the transmission 10 is shifted up (its speed ratio is decreased) at a relatively high rate. This state of operation of the speed-ratio control valve assembly (58, 60) is referred to as "FIRST STATE" as previously discussed and indicated in Table 1.

In the case where the controller 14 judges in step S7 that the absolute value $|E|$ is not greater than A1 (not within the range H), the step S7 is followed by step S9 wherein the controller 14 judges whether the value $|E|$ is equal to or smaller than the value A4, i.e., whether the value $|E|$ falls within the range J.

If the value $|E|$ is equal to or smaller than the value A4, the controller 14 then goes to step S10 wherein no DRIVE signal SD2 is applied to the solenoid 31 and the solenoid valve 30 is in the closed position with the solenoid 31 held in the OFF position. In this condition, it is considered that the duty cycle of the solenoid valve 30 is 0%.

With the solenoid 31 turned OFF, the pilot pressure (line pressure) is applied to the end face 135 of the spool 134 through the orifice 134, and the spool 134 is moved against the biasing force of the spring 136 to its FIRST position of FIG. 3. In this position, the line pressure from the conduit 72 through the spool valve 118 in the FEED position is applied to the first hydraulic cylinder 44 through the restricting orifice 150 incorporated in the spool valve 120. In this instance, the fluid flow to be fed into the cylinder 44 is held at a level Q2 shown in FIG. 11. Therefore, the effective diameter of the first pulley 24 is slowly increased and the transmission 10 is shifted up at a relatively low rate. This state of operation of the speed-ratio control valve assembly (58 and 60) is referred to as "THIRD STATE" as previously discussed and indicated in Table 1.

In the case where the transmission 10 is shifted down with the spool 124 placed in the DISCHARGE position, steps S11–S14 similar to the steps S7–S10 are performed. In steps S11 and S13, the critical values A2 and A3 are used in place of the values A1 and A4 used in the steps S7 and S9. If the controller 14 judges in step S11 that the value $|E|$ is greater than the value A2, step S12 is executed to turn OFF the solenoid 31. Accordingly, the spool 134 is placed in the FIRST position at which the pressurized fluid in the hydraulic cylinder 44 is rapidly discharged into the drain conduit 131 through the input and discharge ports 140, 144 of the spool valve 120, and through the spool valve 118 in the DISCHARGE position, without flow restriction in the spool valve 120. As a result, the transmission 10 is shifted down at a relatively high rate. However, in the event that the value $|E|$ is judged in step S11 not to be larger than the value A2, and in step S13 to be equal to or smaller than the value A3, the solenoid valve 30 is opened with the solenoid 31 turned ON in step S14. Consequently, the spool 134 is placed in the SECOND position at which the discharge flow from the first hydraulic cylinder 44 is restricted by the orifice 146 before the fluid is discharged into the drain conduit 131 through the discharge conduit 130 and spool valve 118 in the DISCHARGE position. Hence, the transmission 10 is shifted down at a relatively low rate due to a slow discharge flow through the spool valve 120. The discharge flow is held at a level Q3 of FIG. 12 when the spool 134 is in the FIRST position, while the discharge flow is at a level Q4 when the spool 134 is in the SECOND position. As indicated in Table 1, the state in which the spools 124 and 134 are placed in the DISCHARGE and FIRST positions, respectively, is referred to as "SECOND STATE" of the speed-ratio control valve assembly (58 and 60). In the case where the spools 124 and 134 are placed in the DISCHARGE and SECOND positions, respectively, the valve assembly (58, 60) is placed in the "THIRD STATE". As is apparent from the foregoing description, the "THIRD STATE" is interpreted to mean the operating condition in which the fluid flow into or from the cylinder 44 is restricted by the orifice 150 or 146.

The foregoing description is concerned with the periods of shifting-up and shifting-down operations wherein the absolute value $|E|$ of the error $E$ ($=N_D-N_A$) between the target and actual engine speeds falls within the predetermined higher range (H of FIG. 9 or K of FIG. 10), or within the predetermined lower range (J of FIG. 9 or M of FIG. 10). It is important to note that a substantive control of the duty cycle of the valve assembly (59 and 60) is not effected while the value $|E|$ is held within one of those ranges H, K, J and M. The duty cycle is controlled during the periods of shifting-up or shifting-down operation wherein the value $|E|$ is judged, in steps S7 and S9 or in steps S11 and S13, to fall within an intermediate range I of FIG. 9 defined by the values A1 and A4, or within an intermediate range L of FIG. 10 defined by the values A2 and A3.

While the value $|E|$ falls within the range I or L, the duty cycle control is effected by applying current pulses to the solenoid 31 of the valve 30 while changing the duty cycle of the drive current in response to the change in the absolute value $|E|$ of the error E. For example, while the transmission 10 is shifted up, the controller 14 judges in step S15 whether the value $|E|$ is decreasing or increasing. More precisely, the controller 34 judges whether a difference $|E'|-|E|$ between the last calculated value $|E'|$ and the currently calculated value $|E|$ is positive or negative. If the difference $|E'|-|E|$ is positive, it means that the value $|E|$ of the error E between the target engine speed $N_D$ and the actual engine speed $N_A$ is decreasing, that is, the actual engine speed $N_A$ is approaching the target engine speed $N_D$. In this instance, step S15 is followed by step S16 wherein the controller 14 calculates a duty cycle D1 which is smaller than the last calculated duty cycle D' by an amount of ΔD. This value D1 is determined as the current duty cycle. If the difference $|E'|-|E|$ is negative, it means that the value $|E|$ is increasing, that is, the actual engine speed $N_A$ is departing from the target engine speed $N_D$. In this instance, step S15 is followed by step S17 wherein the controller 14 calculates a duty cycle D1 which is larger than the last calculated duty cycle D' by an amount of ΔD. This value D1 is determined as the current duty cycle.

In order to calculate the current duty cycle D1, the controller 14 stores data representing the following equation (1), for example:

$$D1 = [(1/B) \times |N_D - N_A| + C] \times 100 \qquad (1)$$

where, B, C: constants

Assuming that B=1000, C=0.3, A1=300 and A4=50, for example, the equation (1) is solved when the value $|N_D - N_A| = |E|$ has become equal to 300. At this moment, the current duty cycle D1 is obtained as 60%.

While the current duty cycle D1 in a shift-up process is determined in steps S15, S16, S17, this duty cycle D1 is not applicable to a shift-down process because the fluid flow restriction/non-restriction conditions corresponding to ON/OFF positions of the solenoid valve 30 in the shift-down process are reversed from those in the shift-up process.

For the above reason, the controller 14 judges in step S18 whether the error E is positive or negative to determine if the duty cycle D1 as calculated in step S16 or S17 may be used. If the error E is negative, it means that the transmission 10 is now shifted up, and the duty cycle D1 as calculated in step S16 or S17 is used as the output. If the error E is positive, it means that the transmission 10 is in a shift-down process and the controller 14 goes to step S19 wherein the following equation (2) is solved:

$$D2 = [1 - (D1/100)] \times 100 \qquad (2)$$

The obtained duty cycle D2 is used as the output for the shift-down operation.

The duty cycle D2 may be calculated by solving the following equation (3) instead of the equation (2):

$$D2 = [1 - (1/B) \times |N_D - N_A| + C)] \times 100 \qquad (3)$$

However, the duty cycle D2 may be obtained by inverting pulse signals of the duty cycle obtained by the equation (1). In any case, the duty cycle D2 is 60% when the duty cycle D1 is 40%, for example.

As described above, the duty cycle D1 or D2 is finally determined in step S18 or S19, and the current pulses of the determined duty cycle D1 or D2 are applied to the solenoid valve 30 in step S20 to turn ON and OFF in an alternating fashion. The controller then goes to step S21 to read the duty cycle D1 as the last calculated duty cycle D' which is used in calculating the duty cycle in the next calculating cycle. In this manner, the events of operation which have been described are repeatedly carried out to repeatedly calculate the current duty cycle in response to the change in the error E, so that the shift-speed control valve unit 60 is actuated according to the currently obtained duty cycle.

When current pulses of the determined duty cycle D1 are applied to the solenoid valve 30 during a shift-up operation of the transmission 10, the solenoid 31 is held non-energized and the spool 134 is placed in the FIRST position, i.e., restricting position (on the side of the spring 136) while the pulse level is low, but the solenoid 31 is energized and the spool 134 is moved to the SECOND position, i.e., non-restricting position when the pulse level becomes high. Thus, the spool 134 is moved between the FIRST and SECOND positions (corresponding to the THIRD and FIRST STATES of Table 1) in a reciprocating manner for alternating restriction and non-restriction of the fluid flow through the spool valve 120. The duty cycle D1 is varied so that it is reduced at a rate corresponding to a rate of decrease in the error E. In other words, as the value E is decreased, the ON time of the solenoid valve 30 is reduced and the OFF time increased, whereby the length of time the spool 134 is placed in the SECOND position is increased. As a result, the rate of flow of the pressurized fluid into the first hydraulic cylinder 44 is gradually decreased as the error E is decreased. When the error E is in the process of increase, on the contrary, the duty cycle D1 is increased and the fluid flow into the cylinder 44 is gradually increased.

Figure 11:
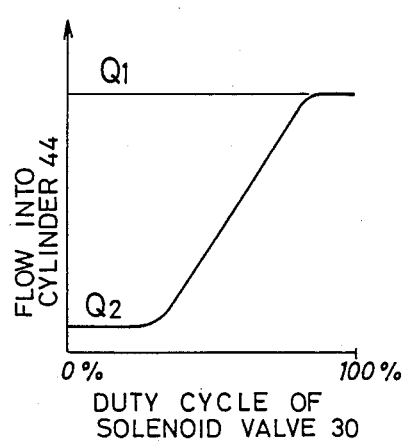
FIGS. 11 and 12 are graphical representations showing changes in the amounts of fluid flow through a shift-speed control valve unit shown in FIG. 3 to and from a hydraulic cylinder, in relation to a duty cycle of a signal applied to actuate a solenoid of the control valve unit.

In the control of the duty cycle described above, the flow of the fluid to the hydraulic cylinder 44 is varied continuously and smoothly in a range between the 100% and 0% levels Q2 and Q1, as shown in FIG. 11. Thus, the rate at which the transmission 10 is shifted up, is changed continuously and in functional relation with the error E so that the shift-up speed is lowered as the error E is reduced.

Figure 12:
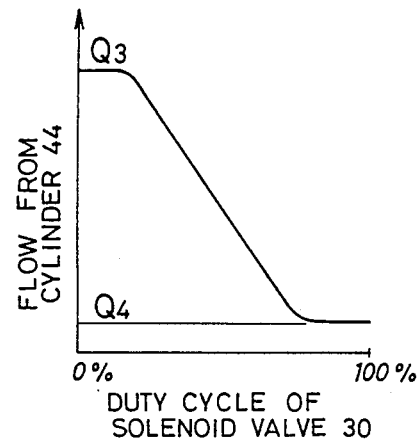

When current pulses of the determined duty cycle D1 are applied to the solenoid valve 30 during a shift-down operation of the transmission 10, the solenoid 31 is held non-energized and the spool 134 is placed in the FIRST position, i.e., non-restricting position (on the side of the spring 136) while the pulse level is low, but the solenoid 31 is energized and the spool 134 is moved to the SECOND position, i.e., restricting position when the pulse level becomes high. Thus, the spool 134 is moved between the FIRST and SECOND positions (corresponding to the SECOND and THIRD STATES of Table 1) in a reciprocating manner for alternating restriction and non-restriction of the fluid flow through the spool valve 120. The duty cycle D1 is decreased and increased as the error E is increased and decreased, respectively. Eventually, the same effect as obtained in the shift-up operation is produced. That is, as the error E is increased, the non-restriction time (OFF time of the solenoid) is increased with a result of increasing the discharge flow from the cylinder 44. Inversely, the restriction time (ON time) is increased and the discharge flow is reduced as the error E is reduced. As a result, the rate of discharge flow of the pressurized fluid from the first hydraulic cylinder 44 is varied continuously in a range between the 100% and 0% levels Q3 and Q4, as shown in FIG. 12. Thus, the rate at which the transmission 10 is shifted down, is changed continuously in response to a variation in the error E which is a difference between the target and actual engine speeds $N_D$ and $N_A$.

By controlling the duty cycle of the shift-speed control valve unit 60 according to the invention as described hitherto, the actual engine speed $N_A$ is controlled so as to approach the determined target engine speed $N_D$ such that the rate of approach is slowed down as the actual value $N_A$ approaches the target value $N_D$. Therefore, the speed ratio of the transmission 10 is controlled with an improved response without an overshoot or hunting trouble. This means that a high control response is obtained without using a flow control valve of proportioning type such as a servo valve which inherently suffers variation in control characteristics due to sticking of a valve member or for other reasons.

Since there are chances that the solenoids 29 and 31 repeatedly energized and deenergized by the DRIVE signals SD1 and SD2 from the controller 14 may both be held energized or deenergized due to a trouble with the electric circuits comprising the controller 14, the present embodiment is adapted such that the speed-ratio control valve assembly (58, 60) is placed in the previously discussed THIRD STATE of operation in the event of such trouble, so that the transmission 10 is protected against abrupt shifting on such occassion.

Stated more particularly, the spool valves 118 and 120 are constructed so that they establish the THIRD STATE (flow restricting state) when both of the solenoids 29 and 31 of the valve units 58 and 60 are placed in the same position (both ON or both OFF).

For easier understanding, Table 2 is given to provide a brief summary of the operation in the present embodiment for controlling the feed and discharge flows to and from the first hydraulic cylinder 44.

While the present invention has been described in its preferred form, it is to be understood that the invention may be embodied in the other forms which will be described. In the following description, the same reference numerals will be used to identify the corresponding elements, and the repeated description thereof is omitted.

TABLE 2

| No. | Solenoid Valves 28 | Solenoid Valves 30 | $|E| = |N_D - N_A|$ | Shifting of Transmission | State of Valve Unit 60 |
|---|---|---|---|---|---|
| 1 | ON | ON | $\leq A3$ | Slow Shift-down | 3rd STATE* Fluid from cylinder 44 is slowly discharged via orifice 146 |
| 2 | ON | ON/OFF | $\leq A2$ | Shift down faster than 1 but more slowly than 3 | Duty Cycle Control through alternate 3rd (1) and 2nd STATES |
| 3 | ON | OFF | $>A2$ | Rapid Shift-down | 2nd STATE* Fluid from cylinder 44 is rapidly discharged. |
| 4 | OFF | ON | $>A1$ | Rapid Shift-up | 1st STATE* Fluid is rapidly fed into cylinder 44 |
| 5 | OFF | ON/OFF | $\leq A1$ | Shift up faster than 6 but more slowly than 4 | Duty Cycle Control through alternate 1st and 3rd (6) STATES |
| 6 | OFF | OFF | $\leq A4$ | Slow Shift-up (or Stop) | 3rd STATE* Fluid is slowly fed into cylinder 44 through orifice 150 |

Note:
For the 1st, 2nd and 3rd STATES, please refer to Table 1.

For example, the orifice 150 formed in the spool valve 120 in the preceding embodiment may be omitted. In this instance, the fluid flow into the cylinder 44 is stopped when the THIRD STATE is established with the spool valve 134 placed in the FIRST position while the spool valve 118 is in the FEED position. In this connection, the "THIRD STATE" is interpreted to also mean the state in which the fluid flow through the spool valve 120 is blocked. This is also applicable to the orifice 146.

Figure 13:
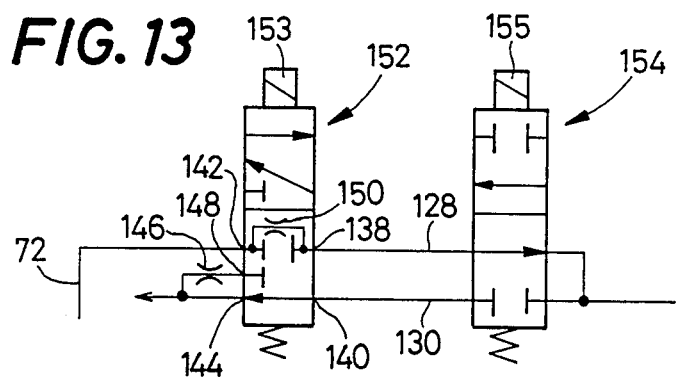
FIGS. 13 and 14 are schematic views of alternative forms of shift-direction switching valve unit and shift-speed control valve unit used in modified embodiments of the invention.

The shift-direction switching valve unit 58 and shift-speed control valve unit 60, and their connection may be modified in suitable ways. One example of a modified valve assembly is shown in FIG. 13, wherein a directly-operated solenoid valve 152 identical in function to the valve unit 60 is used in place of the valve unit 58, and a directly-operated solenoid valve 154 identical in function to the valve unit 58 is used in place of the valve unit 60. In this case wherein the valves 152 and 154 are directly operated by solenoids 153 and 155, respectively, the duty cycle of the flow control solenoid valve 154 is controlled by controlling the energization/deenergization duty cycle of its solenoid 155 through control of the current signals directly applied thereto.

Figure 14:
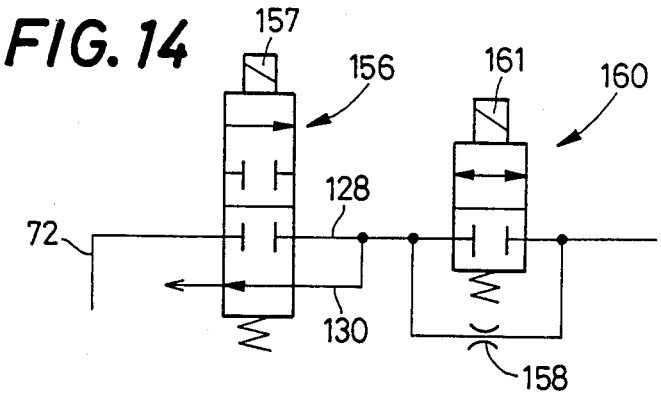

FIG. 14 shows another modified form of the speed-ratio control valve assembly, wherein a solenoid valve 156 directly operated by a solenoid 157 is used, in place of the valve unit 58, for selectively connecting the conduit 72 to the feed conduit 128 or the discharge conduit 130, and a restrictor 158 and a solenoid valve 160 with a solenoid 161 are connected in parallel to each other, and in series to a conduit communicating with both of the feed and discharge conduits 128 and 130. In this arrangement, the duty cycle of the solenoid valve 160 is controlled according to the invention.

Although the preceding embodiment of FIG. 3 uses the shift-speed control valve unit 60 which is adapted to control both feed and discharge flows of the fluid, it is possible to use two separate shift-speed control valve units disposed in mutually independent feed and discharge conduits, respectively. In this case, the feed and discharge flows are regulated by controlling the duty cycles of these two separate valve units independently of each other.

Figure 15:
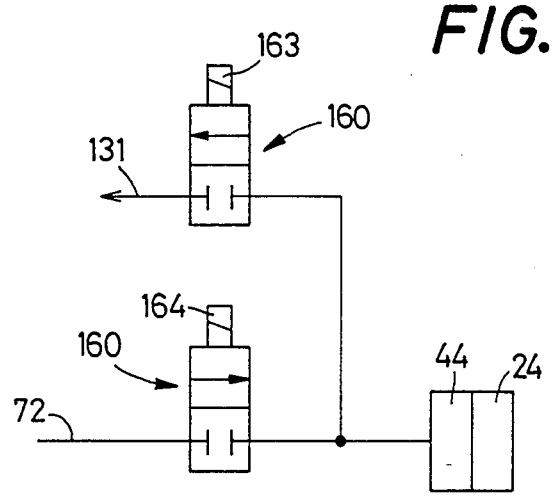
FIGS. 15 and 16 are fragmentary schematic views of further modified embodiments of the invention.
Figure 16:
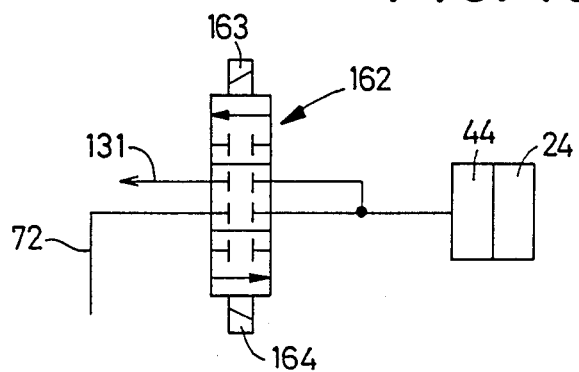

While in the embodiment of FIG. 3 the speed-ratio control valve assembly consists of the valve units 58 and 60, it is appreciated that the control valve assembly be constituted by a pair of solenoid switching valves 160 as shown in FIG. 15, or by a two-solenoid switching valve 162 of FIG. 16 having the substantially same function as the two valves 160. In such arrangements, solenoids 162 and 163 are controlled so as to establish: a first state in which the pressurized fluid is fed to the cylinder 44; a second state in which the fluid is discharged in the cylinder 44; and a third state in which the fluid supply and discharge are both blocked. Therefore, the speed ratio of the transmission may be controlled with a high response similar to that of a proportioning type flow control valve, by controlling the ratio of time of the first state to the second state, or of the second state to the third state, rather than by controlling the duty cycle of the shift-speed control valve unit 60 as in the embodiment of FIG. 3.

It will be apparent that the vales 64, 66, 54, 118, 120, etc. may be accommodated in a single housing.

Obviously, other changes and modifications may occur to those skilled in the art without departing from the scope and spirit of the invention.

We claim:

1. A hydraulic control method for controlling a speed ratio of a hydraulically-operated continuously variable transmission of a vehicle, having (1) an input shaft operatively connected to an engine of the vehicle, (2) an output shaft operatively connected to drive wheels of the vehicle, (3) a pair of variable-diameter pulleys mounted on the input and output shafts, respectively, (4) a transmission belt connecting the pair of variable-diameter pulleys, and (5) a pair of hydraulic cylinders for changing an effective diameter of the pair of pulleys, respectively, one of said hydraulic cylinders being controlled by a speed-ratio control valve assembly which is selectively placed in one of three states of operation consisting of a first state in which a pressurized fluid is fed to said one of the hydraulic cylinders, a second state in which the fluid is discharged from said one hydraulic cylinder, and a third state in which the feed or discharge flow of the fluid to or from said one hydraulic cylinder is restricted, said method comprising the steps of:
- determining a target value of a variable to be controlled such as a target speed of the engine or a target speed ratio of the transmission, based on a currently required output of the engine and according to a predetermined relation between said target value of the variable and said required output; and
- operating said speed-ratio control valve assembly so that a difference between said target value and an actual value of said variable is reduced;
- the step of operating the control valve assembly including a step of establishing said first and third states in an alternate fashion while changing a ratio of an operating time in said first state to that in said third state in response to a variation in said difference, for controlling a rate of flow of said fluid into said one hydraulic cylinder, and further including a step of establishing said second and third states in an alternate fashion while changing a ratio of an operating time in said second state to that in said third state in response to said variation in said difference, for controlling a rate of flow of said fluid from said one hydraulic cylinder,
- whereby the speed ratio of said continuously variable transmission is continuously varied by said one hydraulic cylinder under control of said speed-ratio control valve assembly.

2. A hydraulic control system for controlling a speed ratio of a hydraulically-operated continuously variable transmission of a vehicle, having (1) an input shaft operatively connected to an engine of the vehicle, (2) an output shaft operatively connected to drive wheels of the vehicle, (3) a pair of variable-diameter pulleys mounted on the input and output shafts, respectively, (4) a transmission belt connecting the pair of variable-diameter pulleys, and (5) a pair of hydraulic cylinders for changing an effective diameter of the pair of pulleys, respectively, the hydraulic control system including a speed-ratio control valve assembly associated with one of said hydraulic cylinders, the control valve assembly being selectively placed in one of three states of operation consisting of a first state in which a pressurized fluid is fed to said one of the hydraulic cylinders, a second state in which the fluid is discharged from said one hydraulic cylinder, and a third state in which the feed or discharge flow of the fluid to or from said one hydraulic cylinder is restricted, said hydraulic control system comprising:
- detecting means for detecting an actual value of a variable to be controlled, such as a speed of the engine or a speed ratio of the transmission;
- first determining means for determining a target value of said variable, based at least on a currently required output of the engine and according to a predetermined relation between said target value and said required output;
- second determining means for determining a difference between said target value and said actual value of said variable to be controlled; and
- control means for controlling the operation of said speed-ratio control valve assembly so that said difference is reduced, said control means operating said control valve assembly to establish said first and third states in an alternate fashion while changing a ratio of an operating time in said first state to that in said third state in response to a variation in said difference, for controlling a rate of flow of said fluid into said one hydraulic cylinder, and to establish said second and third states in an alternate fashion while changing a ratio of an operating time in said second state to that in said third state in response to said variation in said difference, for controlling a rate of flow of said fluid from said one hydraulic cylinder,
- whereby the speed ratio of said continuously variable transmission is continuously varied by said one hydraulic cylinder and said speed-ratio control valve assembly under control of said control means.

3. The hydraulic control system of claim 2, wherein said speed-ratio control valve assembly comprises a first and a second solenoid connected to said control means to selectively establish said first, second and third states,
- said control means energizing or deenergizing both of said first and second solenoids to establish said third state,
- said control means selectively controlling said first solenoid to select one of said first and second states, and selectively controlling said second solenoid, to permit a flow of said fluid to or from said one of the hydraulic cylinders in said first or second state, or to restrict said flow in said third state.

4. The hydraulic control system of claim 3, wherein said control means operates said first solenoid according to whether said difference is positive or negative, and operates said second solenoid by applying current pulses of a duty cycle which is varied as said difference is varied, whereby said speed-ratio control valve assembly is alernately placed in said first and third states, or in said second and third states, with said ratio of time being varied in response to the variation in said difference.

5. The hydraulic control system of claim 3, wherein said speed-ratio control valve assembly comprises a shift-direction switching valve unit including said first solenoid, and a shift-speed control valve unit including said second solenoid, said shift-direction switching valve unit being operated by said first solenoid between a feed position for feeding said fluid to said one hydraulic cylinder, and a discharge position for allowing the fluid to be discharged from said one hydraulic cylinder, said shift-speed control valve unit being operated by said second solenoid between a first position for restricting the flow of said fluid to or from said one hydraulic cylinder, and a second position for allowing said flow of the fluid without restriction.

6. The hydraulic control system of claim 5, wherein said shift-speed control valve unit is disposed on a fluid passage between said shift-direction switching valve and said one hydraulic cylinder, said shift-speed control valve unit permitting said flow of the fluid without restriction when an ON/OFF state of said second solenoid is different from that of said first solenoid, and restricting said flow of the fluid when said ON/OFF state of said second solenoid is the same as that of said first solenoid.

7. The hydraulic control system of claim 5, wherein said shift-speed control valve unit includes an orifice for restricting said flow of the fluid in said third state.

8. The hydraulic control system of claim 5, wherein said shift-direction switching valve unit includes a pilot solenoid valve provided with said first solenoid, and a spool valve which is connected to a hydraulic source and to said shift-speed control valve unit and operated with a pilot pressure exerted by said pilot solenoid valve.

9. The hydraulic control system of claim 5, wherein said shift-speed control valve unit includes a pilot solenoid valve provided with said second solenoid, and a spool valve which is connected to said shift-direction switching valve unit and to said one hydraulic cylinder and operated with a pilot pressure exerted by said pilot solenoid valve.

10. The hydraulic control system of claim 2, wherein said one of the hydraulic cylinders is disposed to change the effective diameter of the variable-diameter pulley mounted on said input shaft.

11. A hydraulic control system for controlling a speed ratio of a hydraulically-operated continuously variable transmission of a vehicle, having (1) an input shaft operatively connected to an engine of the vehicle (2) an output shaft operatively connected to an engine of the vehicle, (3) a pair of variable-diameter pulleys mounted on the input and output shafts, respectively, (4) a transmission belt connecting the pair of variable-diameter pulleys, and (5) a pair of hydraulic cylinders for changing an effective diameter of the pair of pulleys, respectively, the hydraulic control system including a speed-ratio control valve assembly associated with one of said hydraulic cylinders, the control valve assembly being selectively placed in one of three states of operation consisting of a first state in which a pressurized fluid is fed to said one of the hydraulic cylinders, a second state in which the fluid is discharged from said one hydraulic cylinder, and a third state in which the feed or discharge flow of the fluid to or from said one hydraulic cylinder is restricted, wherein the improvement comprises:

detecting means for detecting an actual value of a variable to be controlled, such as a speed of the engine or a speed ratio of the transmission;

first determining means for determining a target value of said variable, based at least on a currently required output of the engine and according to a predetermined relation between said target value and said required output;

second determining means for determining a difference between said target value and said actual value of said variable to be controlled; and control means for controlling the operation of said speed-ratio control valve assembly so that said difference is reduced;

said speed-ratio control valve assembly comprising a first and a second solenoid connected to said control means, said control means controlling both of said first and second solenoids to establish said third state, said control means selectively controlling said first solenoid to select one of said first and second states, and selectively controlling said second solenoid to permit a flow of said fluid to or from said one of the hydraulic cylinders in said first or second state, or restrict said flow in said third state, said control means establishing said first and third states in an alternate fashion while changing a ratio of an operating time in said first state to that in said third state, for controlling a rate of flow of said fluid into said one hydraulic cylinder in accordance with said difference, said control means establishing said second and third states in an alternate fashion while changing a ratio of an operating time in said second state to that in said third state in accordance with said difference, for controlling a rate of flow of said fluid from said one hydraulic cylinder, whereby the speed ratio of said continuously variable transmission is continuously varied by said one hydraulic cylinder under control of said speed-ratio control valve assembly.

12. The hydraulic control system of claim 11, wherein said speed-ratio control valve assembly comprises a shift-direction switching valve unit including said first solenoid, and a shift-speed control valve unit including said second solenoid, said shift-direction witching valve unit being operated by said first solenoid between a feed position for feeding said fluid to said one hydraulic cylinder, and a discharge position for allowing the fluid to be discharged from said one hydraulic cylinder, said shift-speed control valve unit being operated by said second solenoid between a first position for restricting the flow of said fluid to or from said one hydraulic cylinder, and a second position for allowing said flow of the fluid without restriction.

13. The hydraulic control system of claim 12, wherein said shift-speed control valve unit is disposed on a fluid passage between said shift-direction switching valve and said one hydraulic cylinder, said shift-speed control valve unit permitting said flow of the fluid without restriction when an ON/OFF state of said second solenoid is different from that of said first solenoid, and restricting said flow of the fluid when said ON/OFF state of said second solenoid is the same as that of said first solenoid.

14. The hydraulic control system of claim 12, wherein said shift-speed control valve unit includes an orifice for restricting said flow of the fluid in said third state.

15. The hydraulic control system of claim 12, wherein said shift-direction switcing valve unit includes a pilot solenoid valve provided with said first solenoid, and a spool valve which is connected to a hydraulic source and to said shift-speed control valve unit and operated with a pilot pressure exerted by said pilot solenoid valve.

16. The hydraulic control system of claim 12, wherein said shift-speed control valve unit includes a pilot solenoid valve provided with said second solenoid, and a spool valve which is connected to said shift-direction switching valve unit and to said one hydraulic cylinder and operated with a pilot pressure exerted by said pilot solenoid valve.

* * * * *

UNITED STATES PATENT AND TRADEMARK OFFICE
CERTIFICATE OF CORRECTION

PATENT NO. : 4,628,773
DATED : December 16, 1986
INVENTOR(S) : Hiroshi Itoh et al It is certified that error appears in the above-identified patent and that said Letters Patent is hereby corrected as shown below:

On the title page "16 Drawing Figures" should read
-- 17 Drawing Firures --.

Signed and Sealed this

Thirty-first Day of March, 1987

Attest:

DONALD J. QUIGG

Attesting Officer

Commissioner of Patents and Trademarks